(12) United States Patent
Fukushima

(10) Patent No.: US 10,389,893 B1
(45) Date of Patent: Aug. 20, 2019

(54) IMAGE FORMING APPARATUS, IMAGE FORMING SYSTEM, AND COMMUNICATION PROCESSING METHOD ALLOWING TO CAPTURE SCREEN FOR REMOTE MAINTENANCE

(71) Applicant: KYOCERA Document Solutions Inc., Osaka (JP)

(72) Inventor: Keisuke Fukushima, Concord, CA (US)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 15/993,818

(22) Filed: May 31, 2018

(51) Int. Cl.
| | | |
|---|---|---|
| G06F 15/00 | (2006.01) | |
| G06F 3/12 | (2006.01) | |
| G06K 1/00 | (2006.01) | |
| H04N 1/00 | (2006.01) | |

(52) U.S. Cl.
CPC ..... *H04N 1/00233* (2013.01); *H04N 1/00167* (2013.01); *H04N 1/00177* (2013.01); *H04N 1/00188* (2013.01); *H04N 1/00411* (2013.01); *H04N 1/00588* (2013.01)

(58) Field of Classification Search
CPC ........... H04N 1/00233; H04N 1/00167; H04N 1/00177; H04N 1/00188; H04N 1/00411; H04N 1/00588
USPC .......................................... 358/1.15, 1.1, 1.13
See application file for complete search history.

(56) References Cited

U.S. PATENT DOCUMENTS

| | | | | |
|---|---|---|---|---|
| 2013/0235424 | A1* | 9/2013 | Yamada | H04N 1/00129 358/1.15 |
| 2018/0054544 | A1* | 2/2018 | Isobe et al. | H04N 1/32651 358/1.15 |
| 2018/0352110 | A1* | 12/2018 | Shibao | H04N 1/32 358/1.15 |

FOREIGN PATENT DOCUMENTS

JP          2007-115039 A        5/2007

\* cited by examiner

*Primary Examiner* — Douglas Q Tran
(74) *Attorney, Agent, or Firm* — Hawaii Patent Services; Nathaniel K. Fedde; Kenton N. Fedde

(57) ABSTRACT

Provided is an image forming apparatus that preserves operation of a remote support. A connecting part connects with the terminal for remote maintenance in a session of a specific protocol. An operation acquiring part acquires operational information corresponding to operation of the connected terminal. A capturing part captures an emulated image. An image transmitting part having in the terminal transmits image data including the emulated image captured by the capturing part.

13 Claims, 7 Drawing Sheets

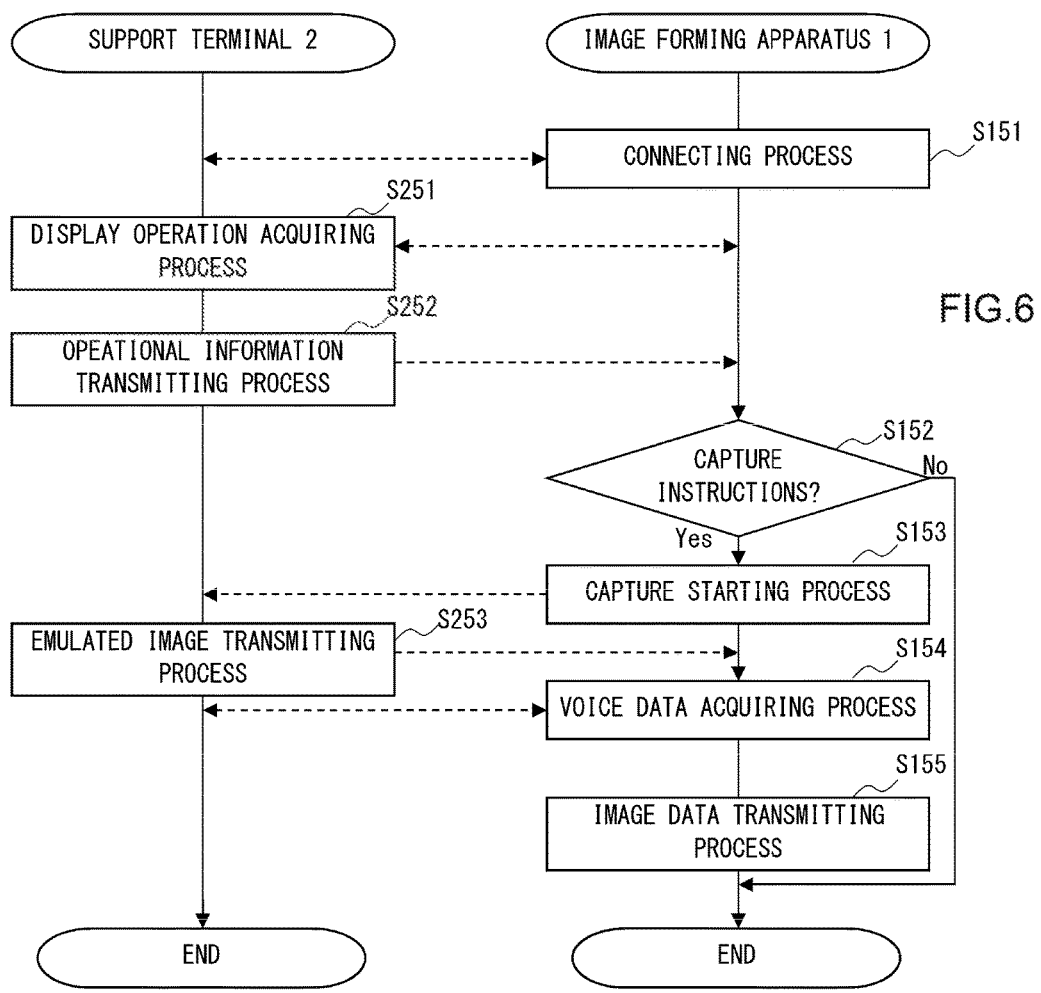

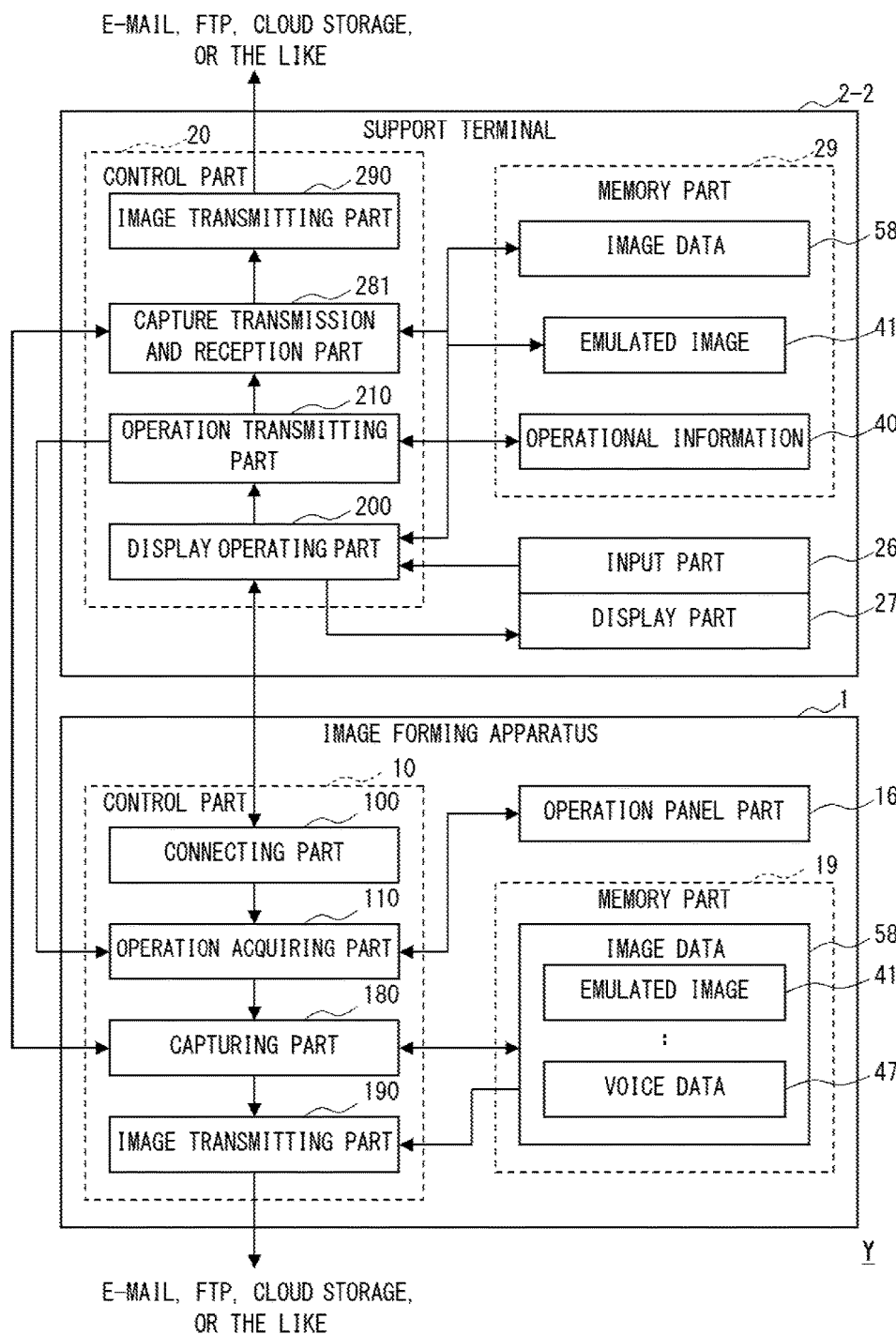

IMAGE FORMING APPARATUS, IMAGE FORMING SYSTEM, AND COMMUNICATION PROCESSING METHOD ALLOWING TO CAPTURE SCREEN FOR REMOTE MAINTENANCE

BACKGROUND

The present disclosure relates to an image forming apparatus, an image forming system, and a communication processing method, especially is associated with the image forming apparatus, the image forming system, and the communication processing method, which enables remote maintenance.

An image forming apparatus, such as an MFP (Multi-Functional Peripheral), is used to print a document and an image.

Here, as typical technology, an image forming system that can reproduce a sequence of operations performed for apparatus as controlled objects, such as an image forming apparatus, is disclosed. In this technology, a control part of a remote terminal transmits coordinate data of position where click operation of the mouse is performed to a copying machine. The control part of the copying machine receives the coordinate data from the remote terminal. Then, respective coordinate data is compared with remote control screen data. In this comparison, whether the clicked position is on the remote setting panel or it is on a hard-key panel is determined. Operational information corresponding to the decision result is stored as script data. Then, the operational information in script data is read one at a time. Processing operation based on respective operational information is performed, sequentially. As a result, the sequence of operations performed by the user is reproduced. As configured in this way, improvement in the operativity of the apparatus can be promoted.

SUMMARY

An image forming apparatus in the present disclosure includes a connecting part configured to connect with a terminal for remote maintenance in a session of a specific protocol; an operation acquiring part configured to acquire operational information corresponding to operation of the terminal connected by the connecting part; and a capturing part configured to capture an emulated image emulated on an operation panel of a self-apparatus, drawn as corresponding to the operational information acquired by the operation acquiring part, and displayed on a web browser of the terminal; and an image transmitting part configured to transmit image data including the emulated image captured by the capturing part.

An image forming system in the present disclosure has an image forming apparatus and a terminal for remote maintenance of the image forming apparatus, wherein the image forming apparatus includes: a connecting part configured to connect with the terminal in a session of a specific protocol, an operation 3 acquiring part configured to acquire operational information corresponding to operation of the terminal connected by the connecting part, and a capturing part configured to capture an emulated image emulated on an operation panel of a self-apparatus, drawn as corresponding to the operational information acquired by the operation acquiring part, and displayed on a web browser of the terminal; and the terminal includes: an operation transmitting part configured to transmit the pointer data about movement and depression of a pointer in the emulated image displayed on the web browser to the image forming apparatus in the session as the operational information, and a capture transmitting part configured to transmit the emulated image to the image forming apparatus as extended data with an attribute other than the pointer data transmitted by the operation transmitting part.

A communication processing method in the present disclosure is executed by an image forming apparatus capable of communicating to a terminal for remote maintenance, including the steps of: connecting with the terminal in a session of a specific protocol; acquiring operational information corresponding to operation of the connected terminal; capturing an emulated image emulated an operation panel of a self-apparatus, drawn as corresponding to the acquired operational information, and displayed on a web browser of the terminal; and transmitting image data including the captured emulated image.

BRIEF DESCRIPTION OF THE DRAWINGS

FIG. 6 is a flow chart of a capture transmitting process according to the embodiment in the present disclosure; and FIG. 7 is a block diagram showing a functional configuration of an image forming system according to other embodiment in the present disclosure.

SPECIFICATION

Embodiment

[System Configuration of Image Forming System X]

Figure 1:
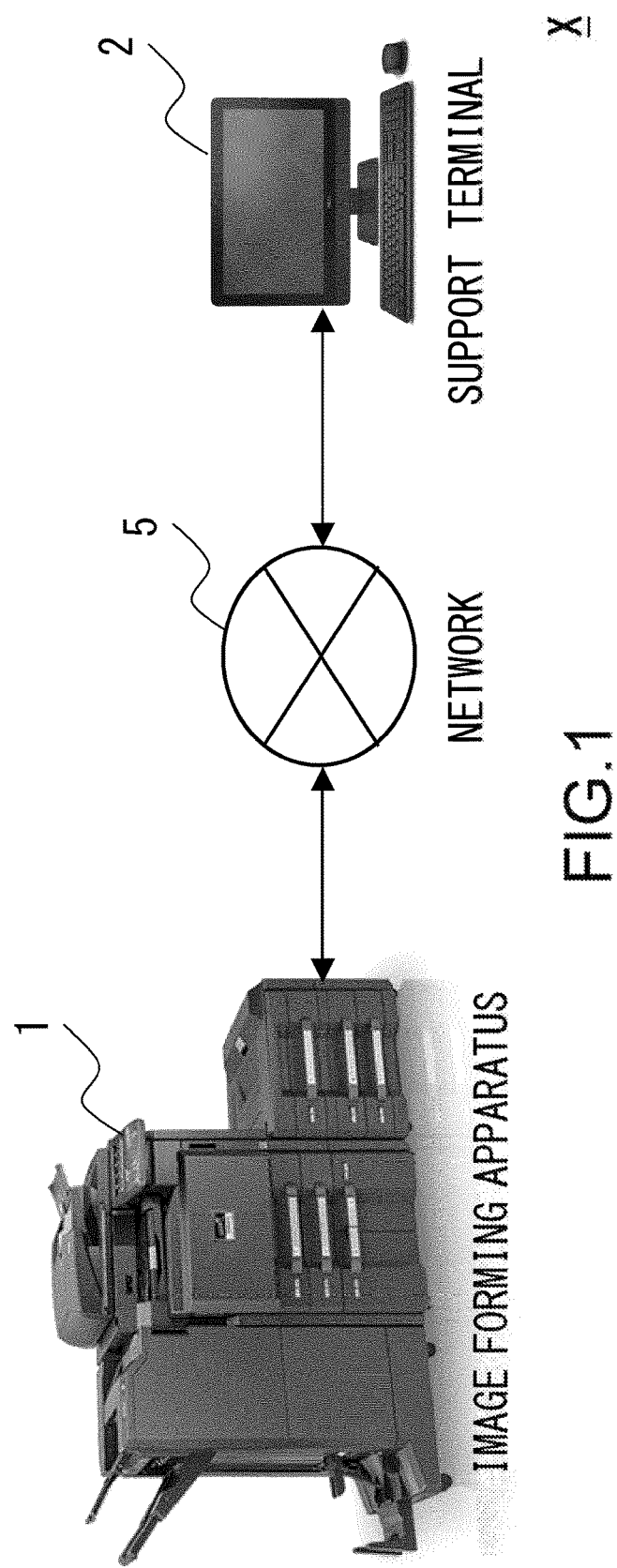
FIG. 1 is a system configuration figure of the image forming system according to an embodiment of the present disclosure.
Figure 2:
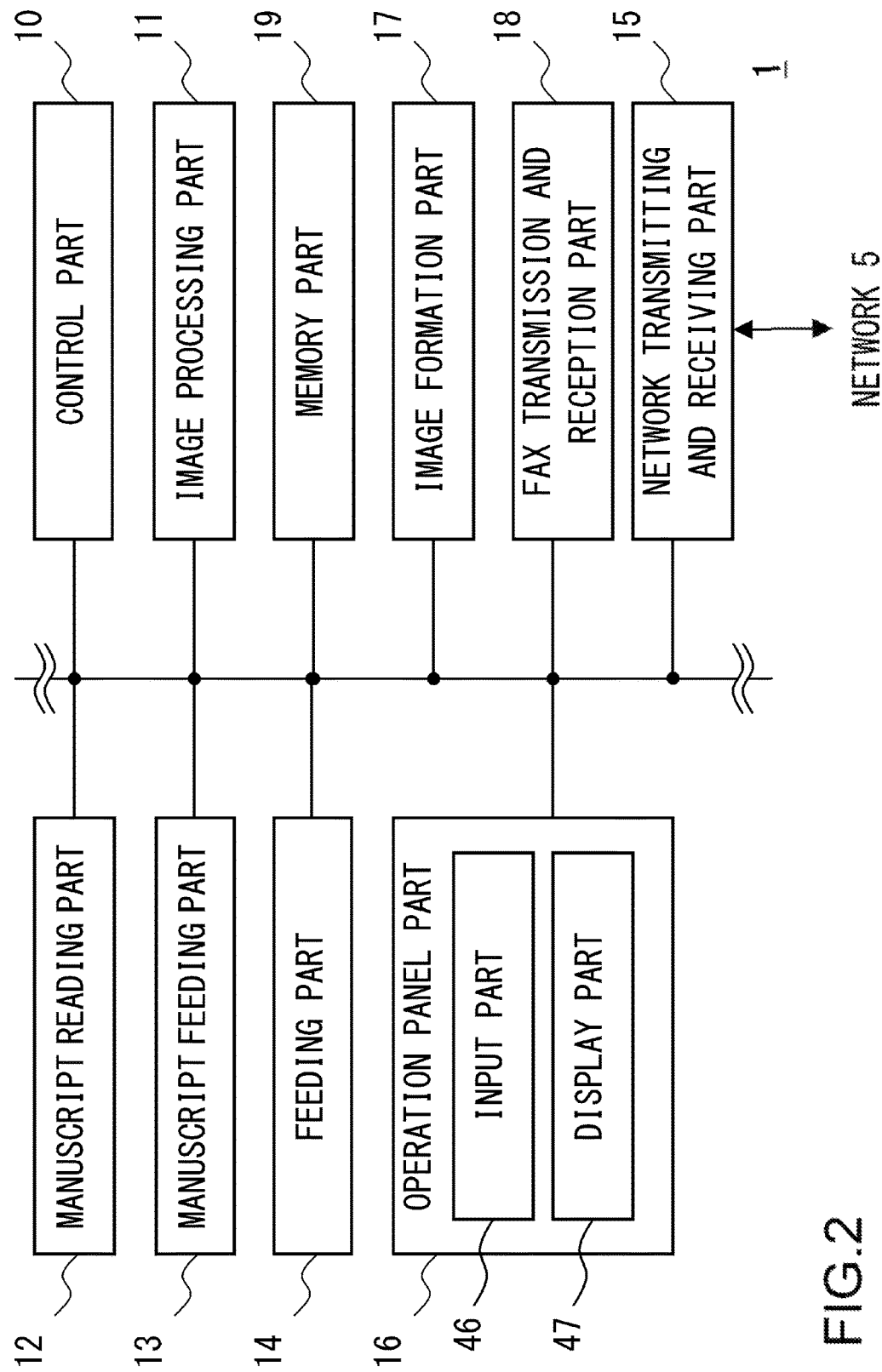
FIG. 2 is a block diagram showing a control configuration of the image forming apparatus as shown in FIG. 1.
Figure 3:
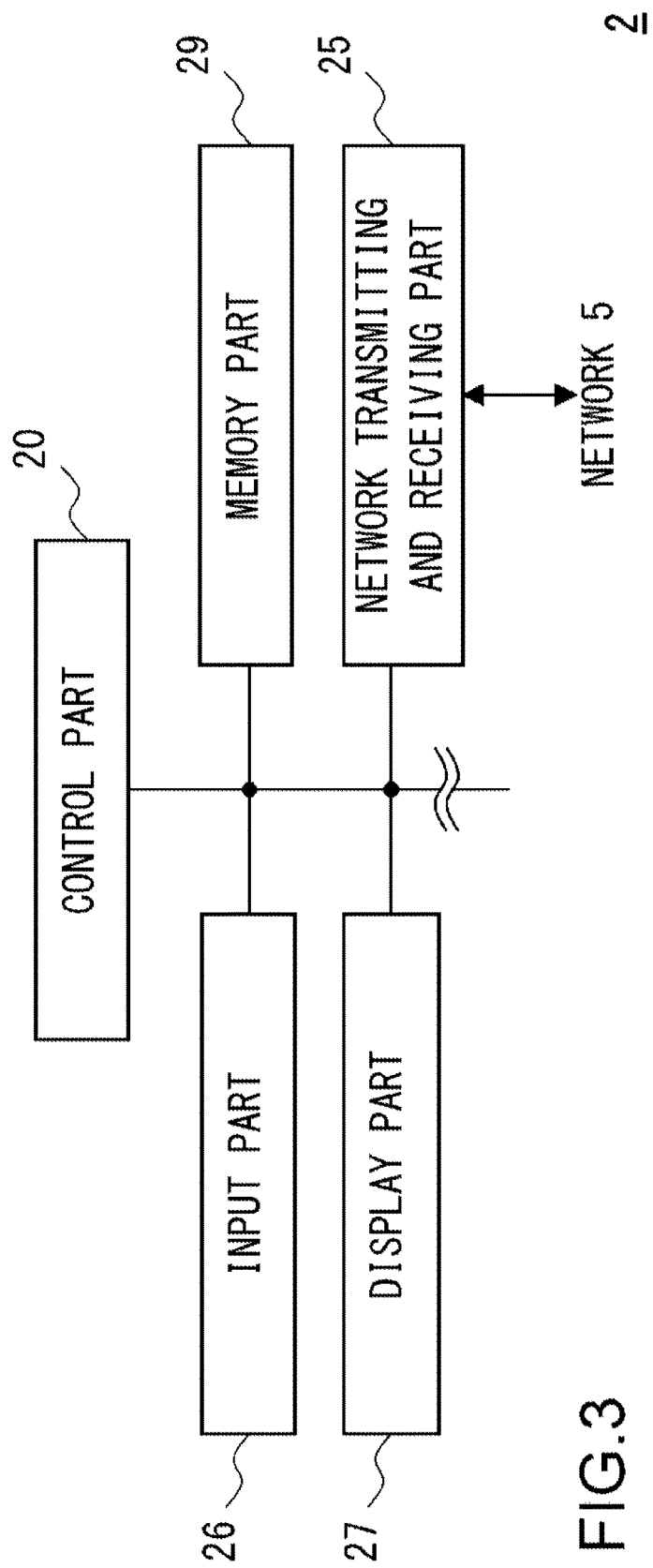
FIG. 3 is a block diagram showing a control configuration of the support terminal as shown in FIG. 1.
Figure 4:
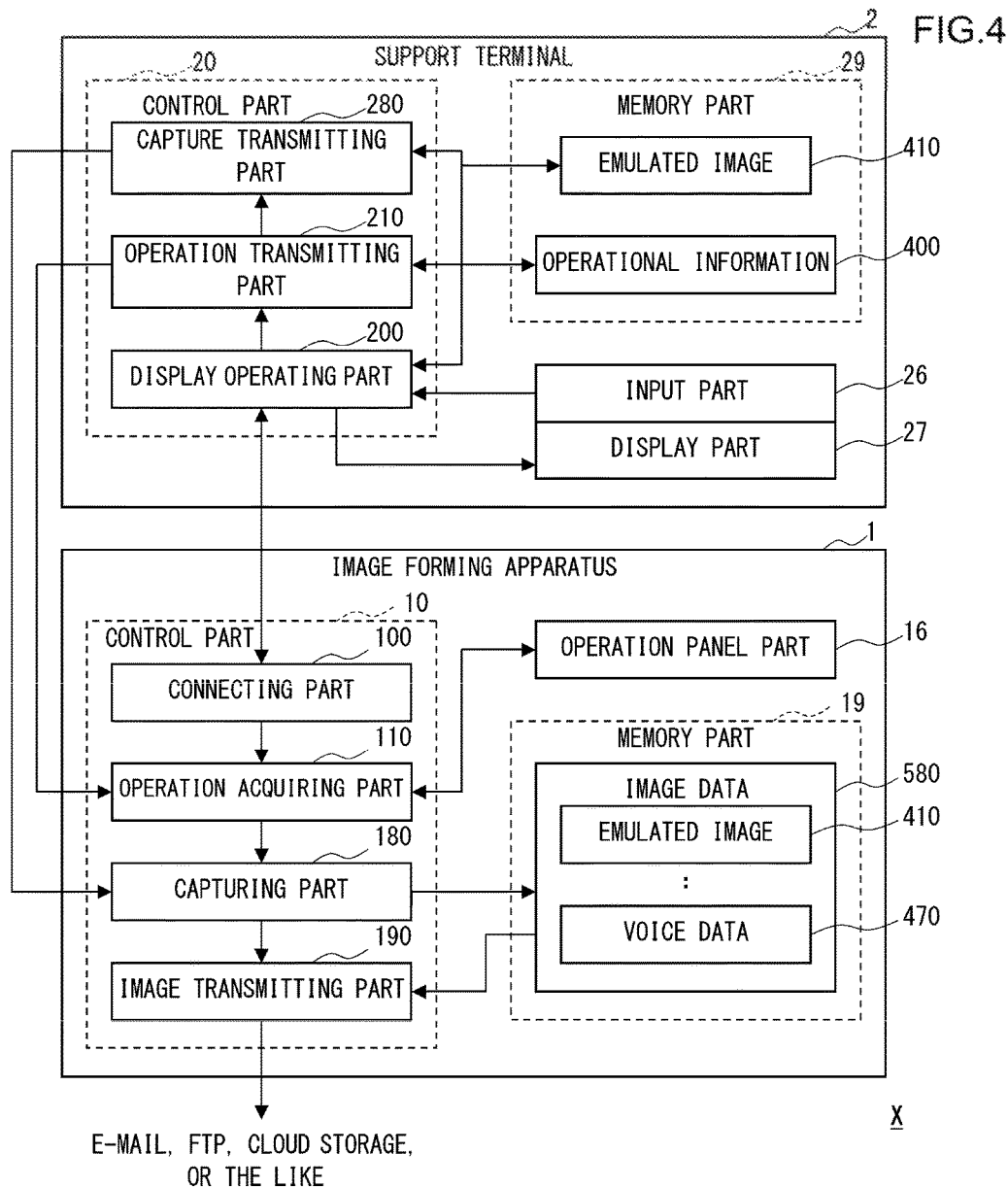
FIG. 4 is a block diagram showing a functional configuration of the image forming system according to the embodiment of the present disclosure.
Figure 5:
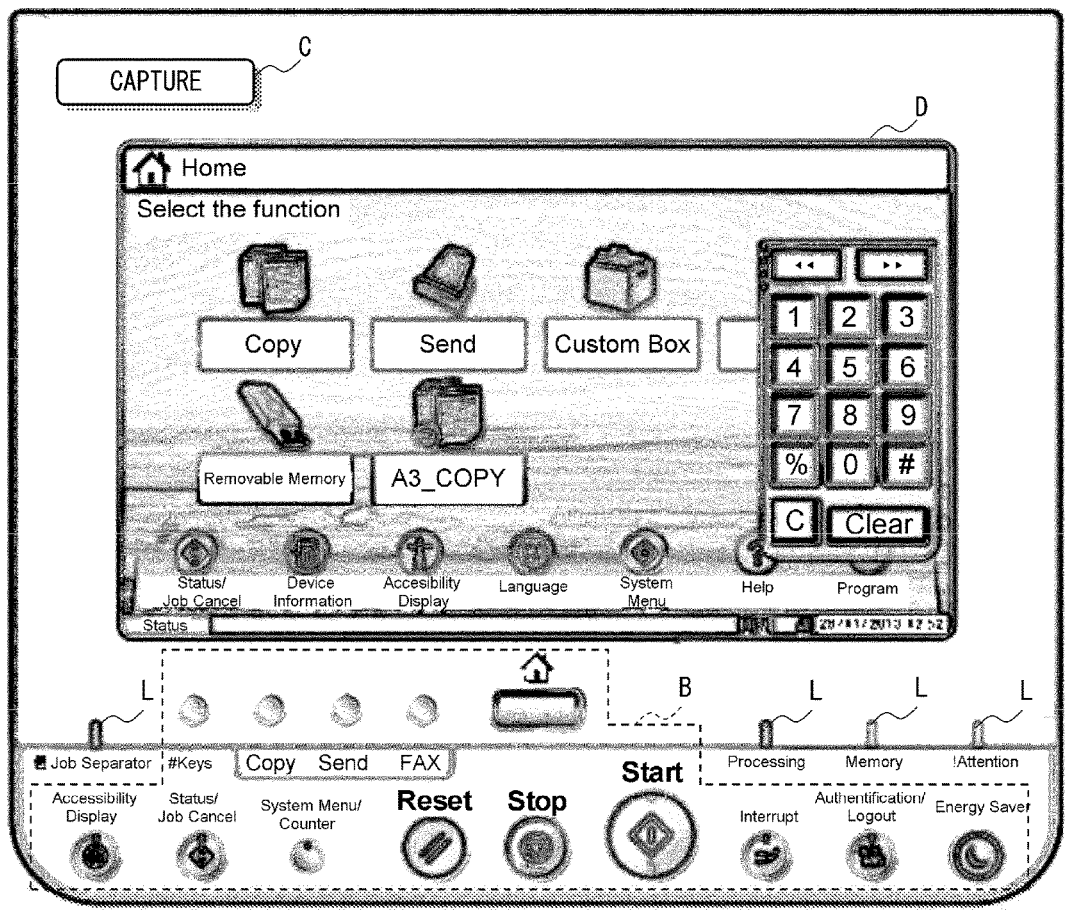
FIG. 5 shows a screen example of the emulated image shown in FIG. 4.

Firstly, as refer to FIG. 1-FIG. 3, the system configuration of image forming system X according to the embodiment of the present disclosure is explained.

According to FIG. 1, image forming system X according to the embodiment of the present disclosure includes image forming apparatus 1 and support terminal 2 for remote maintenance of image forming apparatus 1. Also, each apparatus is connected with network 5.

Image forming apparatus 1 is information processing apparatus, such as an MFP, a network scanner, a document scanner, network FAX, a printer, or the like. Also, image forming apparatus 1 can perform copying a document, printing, scanning, transmitting facsimile, or the like.

Also, in image forming apparatus 1 in the present embodiment, remote maintenance between remote places via network 5 is available. In service of the remote maintenance, an IT administrator, or the like, who is a customer, is in the side of image forming apparatus 1, and he or she perform maintenance by receiving instructions from a support personnel.

Support terminal 2 is PC, a mobile phone, a smart phone, PDA (Personal Data Assistant), a business-use support terminal, a dedicated terminal, or the like. Also, in support terminal 2, a kind of general-purpose OS (Operating System), or the like, is executed. Also, support terminal 2 can install a various application software (henceforth, an "application").

Also, support terminal 2 is a terminal for remote maintenance. The support personnel of the remote maintenance service as mentioned above use support terminal 2 and instructs to the IT administrator, or the like, for image forming apparatus 1. In this case, support terminal 2 displays a screen just emulated operation panel part 16 (FIG. 2) in image forming apparatus 1 and indicates various instructions on the screen. The contents of instructions by the support personnel via the screen are reflected on display part 47, or the like, in image forming apparatus 1. Also, image forming apparatus 1 is controlled corresponding to the button on the screen.

That is, in the present embodiment, the support may be performed with one to one communication by using function as a remote desktop function provided in an OS of a common PC. Therefore, for example, a RFB server, or the like is executed in image forming apparatus 1, and an RFB client is executed in support terminal 2. Also, support terminal 2 may execute the RFB client by using Java Script®, or the like. In this case, the image emulated operation panel part 16 can be displayed on support terminal 2, and image forming apparatus 1 can be controlled based on the displayed image. That is, support terminal 2 displays the emulated screen as a "remote panel" by using a web browser, and it can control image forming apparatus 1. In detail, it is possible to use functions, such as a print, a scan, FAX transmission and reception, and network FAX, in image forming apparatus 1 with instructions by the support personnel from support terminal 2. By using these functions, it becomes possible to check and to show solution of a problem situation for a customer's image forming apparatus 1 from a remote environment.

Network 5 is, in the present embodiment, LAN (Local Area Network), such as intranet, or the like, or WAN (Wide Area Network), such as the Internet, a mobile phone network, or the like. In case that network 5 is WAN, it connects with other servers via a router, a gateway, or the like. Also, network 5 may configure VPN (Virtual Private Network).

In addition, in image forming system X, it may include a plurality of image forming apparatuses 1 and support terminals 2, respectively.

(Configuration of Image Forming Apparatus 1)

Then, as refer to FIG. 2, a configuration of image forming apparatus 1 according to the embodiment of the present disclosure is explained. Image forming apparatus 1 may include image processing part 11, manuscript reading part 12, manuscript feeding part 13, feeding part 14, network transmitting and receiving part 15, operation panel part 16, image formation part 17 (image forming unit), FAX transmission and reception part 18, memory part 19, or the like. Each part is connected to control part 10, and these operations are controlled by control part 10.

Control part 10 is an information processing part, such as GPP (General Purpose Processor), CPU (Central Processing Unit), MPU (Micro Processing Unit), DSP (Digital Signal Processor), GPU (Graphics Processing Unit), ASIC (Application Specific Processor), or the like. Control part 10 reads the control program stored in ROM or HDD of memory part 19, expands to RAM, executes the control program, and is operated as each part of a functional block as described later. Also, control part 10 controls a whole device corresponding to specified instructions information inputted from support terminal 2 or operation panel part 16.

Image processing part 11 is a control arithmetic unit, such as DSP (Digital Signal Processor) or GPU (Graphics Processing Unit), or the like. Image processing part 11 performs specified image processing for image data. For example, the specified image processing may be a process of scaling, concentration tuning, tone adjustment, an image improvement, or the like. Also, image processing part 11 stores the image read by manuscript reading part 12 as print data in memory part 19. In this case, image processing part 11 can also convert print data into an electronic filing documents, such as PDF, or the like, or a file of an image data, such as TIFF, or the like. Also, image processing part 11 may be able to execute at least a part of a process of OCR (Optical Character Recognition).

Manuscript reading part 12 reads a set manuscript. Manuscript reading part 12 is arranged on the upper part of the body part of image forming apparatus 1. Manuscript reading part 12 is provided with a scanner, platen glass, and a manuscript reading slit. Manuscript reading part 12 moves the scanner to the position that faces the platen glass when reading the manuscript placed on the platen glass. Manuscript reading part 12 is read the manuscript placed on the platen glass with scanning and acquires image data. Manuscript reading part 12 outputs the acquired image data to control part 10.

Also, manuscript reading part 12 moves the scanner to the position which faces a manuscript reading slit when reading the manuscript fed from manuscript feeding part 13. Then, via the manuscript reading slit, manuscript reading part 12 reads the manuscript synchronizing with conveyance operation of the manuscript by manuscript feeding part 13, and it acquires image data. Manuscript reading part 12 outputs the acquired image data to control part 10.

Manuscript feeding part 13 conveys the manuscript read by manuscript reading part 12. Manuscript feeding part 13 is arranged on the upper part of manuscript reading part 12. Manuscript feeding part 13 is provided with a manuscript mounting part and a manuscript transport mechanism. Manuscript feeding part 13 feeds out the manuscript placed on the manuscript mounting part one sheet at a time by using the manuscript transport mechanism, and it feeds to manuscript reading part 12.

Feeding part 14 feeds out a recording paper one sheet at a time to image formation part 17. Feeding part 14 is provided in the body part.

Network transmitting and receiving part 15 is a network connection part including a LAN board, a wireless transceiver, or the like, for connecting with external networks, such as LAN, wireless LAN, WAN, the mobile phone network, or the like. Network transmitting and receiving part 15 transmits and receives data by using a line for data communications, and transmits and receives an audio signal by using a voice call line.

Operation panel part 16 is arranged in front-side of image forming apparatus 1. Also, operation panel part 16 includes input part 46 and display part 47.

Input part 46 is an input unit of a touch panel, physical buttons, or the like, which acquires the instructions by IT administrator, or the like, to image forming apparatus 1. Input part 46 may include buttons, such as a start, a stop, a reset, a copy, a transmission, and a FAX, or the like, to instruct for calling various functions. Also, input part 46 may include a physical numeric keypad, a "#Keys" button for displaying a numeric keypad on display part 47, a "home" button for returning to the "home" screen that is the first screen, or the like. Also, input part 46 may include various buttons, such as an "Interrupt" of a job, an "Authentication/Logout," an "Energy saver," or the like. Also, input part 46 may include buttons for making a various state of performing an instruction about the job change, such as an "Accessibility Display," a "Status/Job cancel," a "System Menu/Counter," or the like. Also, the job to be instructed may be types, such as printing, transmitting, storing, and recording for a selected document.

In addition, it is also possible to input and change each user's information with a user's instructions acquired from input part 46. Also, input part 46 can connect a reader for a magnetic card or an IC card, a device for biometric authentication, or the like.

Display part 47 includes a display panel, such as LCD (Liquid Crystal Display), an organic EL display, and an indicator, such as LED (Light Emitting Diode), or the like. The display panel of display part 47 can display a various operation screens of GUI (Graphical User Interface). In the present embodiment, input part 46 and display part 47 may be combined and configured as like a display having a touch panel. Therefore, it is also possible to arrange buttons for various operations on display part 47 and is instructed via input part 46 by depressing them. Also, as above-mentioned, it is possible to display a numeric keypad on display part 47. Also, LED of display part 47 can display various states. Also, LED can display the various states of the self-apparatus. Also, some of LED, or the like, for display part 47 may be provided inside of the button. Thereby, it can inspect a state of depression of the button, or the like.

Also, operation panel part 16 may be provided with a connecting part that connects with an external record medium, such as flash memory card, a USB storage apparatus, or the like.

Image formation part 17 makes the image formation from the data stored in memory part 19, read by manuscript reading part 12, or acquired from the external support terminal by a user's output instruction to a recording paper perform. Image formation part 17 is provided with a photo conductor drum, an exposure part, a developing part, a transfer part, a fixing part, or the like. Image formation part 17 records a toner image on a recording paper by performing an image formation process of electrification, exposure, development, transfer, and fixing.

FAX transmission and reception part 18 transmits and receives a facsimile. FAX transmission and reception part 18 can perform facsimile receiving from other FAX equipment via a voice line, can preserve it on memory part 19, and can perform image formation by image formation part 17. Also, FAX transmission and reception part 18 converts the manuscript read by manuscript reading part 12, the data of network FAX transmitted from the external support terminal into image data. FAX transmission and reception part 18 can perform facsimile transmission of the image data to other FAX equipment via a voice line.

Memory part 19 is a memory part having a non-transitory recording medium. Memory part 19 may include, for example, semiconductor memory, such as ROM (Read Only Memory), RAM (Random Access Memory), or the like, or HDD (Hard Disk Drive), or the like. RAM of memory part 19 may be held a memory content in a power-saving state by self refreshing function, or the like. The control program for operation-controlling image forming apparatus 1 is stored in ROM or HDD of memory part 19. The control program may be an OS and various applications. In addition, memory part 19 may also store user account settings. Also, an area of a storage folder (Document box) for each user may be included in memory part 19.

In addition, image forming apparatus 1, control part 10 and image processing part 11 may be integrally-formed as like CPU with built-in GPU, a chip-on module package, SOC (System On Chip), or the like. Also, control part 10 and image processing part 11 may contain RAM, ROM, a flash memory, or the like.

(Configuration of Support Terminal 2)

Also, according to FIG. 3, support terminal 2 is provided with control part 20, network transmitting and receiving part 25, input part 26, display part 27, memory part 29, or the like.

Control part 20 may be an information processing part, such as GPP (General Purpose Processor), CPU (Central Processing Unit), MPU (Micro Processing Unit), DSP (Digital Signal Processor), GPU (Graphics Processing Unit), ASIC (Application Specific Processor, processor for particular applications), or the like.

Input part 26 is a keyboard, various sensors, a pointing device, or the like, for acquiring the various instructions by a user. The pointing device includes a touch panel, a digitizer, a touchpad, or the like. Input part 26 can make various instructions input by a user, such as the support personnel, or the like, by using GUI (Graphical User Interface) of OS and can acquire this. Also, information of moving the pointer and depressing a key (physical key) of the keyboard in input part 26 is transmitted to image forming apparatus 1. That is, the display of display part 27 explained below is updated based on this information.

Display part 27 includes a flat-panel screen panel, such as LCD, an organic EL display, a FED (Field Emission Display), a fluorescent character display tube, or the like, a projector, LED for a status display, or the like. Display part 27 can display various operation screens according with GUI. In addition, input part 26 and display part 27 may be integrally-formed as like a display with the touch panel or the digitizer.

Network transmitting and receiving part 25 is a network connection part including a LAN board, a wireless transceiver, or the like, for connecting with network 5.

Memory part 29 is a memory part having a non-transitory recording medium. Memory part 29, for example, may include various RAM as a main memory part. Also, memory part 29, for example, may include ROM, eMMC (embedded Multi Media Card), SSD (Solid State Drive), HDD, or the like as an auxiliary memory part. Also, memory part 29 stores a control program for the self-apparatus. The control program may be various OS, a web browser that can browse webs, such as WWW, or the like, various applications, or the like. Also, memory part 29 may include external storages, such as various flash memories, optical recording media, or the like.

[Functional Configuration of Image Forming System X]

Control part 10 of image forming apparatus 1 is provided with connecting part 100, operation acquiring part 110, capturing part 180, and image transmitting part 190. Memory part 19 of image forming apparatus 1 stores image data 580. Control part 20 of support terminal 2 is provided with display operating part 200, operation transmitting part 210, and capture transmitting part 280. Memory part 29 of support terminal 2 stores operational information 400 and emulated image 410.

Connecting part 100 connects with support terminal 2 in a session of a specific protocol. The specific protocol may be a protocol extended from the RFB protocol. In this case, connecting part 100 may execute a program compatible with the RFB server. Also, connecting part 100 can transmit emulated image 410 to support terminal 2 according to the instructions from operation acquiring part 110. The transmission may be executed as corresponded to the RFB protocol.

Operation acquiring part 110 acquires operational information 400 corresponding to operation of support terminal 2 connected by connecting part 100. Also, operation acquiring part 110 interprets operational information 400, updates display part 47 of operation panel part 16, and generates and updates emulated image 410 corresponding to this. In this case, operation acquiring part 110 may generate and update emulated image 410 based on states of a display panel, LED, or the like, in display part 47.

Capturing part 180 captures emulated image 410. Here, in the present embodiment, emulated image 410 captured by capturing part 180 is an image drawn as corresponding to operational information 400 acquired by operation acquiring part 110, as described later. Also, in the present embodiment, emulated image 410 is the image emulated on operation panel part 16 of the self-apparatus and displayed on the web browser in support terminal 2. In detail, capturing part 180 may acquire emulated image 410 transmitted from capture transmitting part 280 in support terminal 2 and may include it in image data 580 in memory part 19. In this case, capturing part 180 may capture emulated image 410 with extended data other than the pointer data included in operational information 400. Also, capturing part 180 may accumulate emulated image 410 in image data 580 and may convert it into video data. The video data may be stored in various containers, such as MJPEG or MPG, or the like. Also, capturing part 180 may include voice data 470 in video data as described later.

Image transmitting part 190 transmits image data 580 including emulated image 410 captured by capturing part 180. In detail, image transmitting part 190 may transmit image data 580 with various protocols. In case of the protocol of an e-mail (SMTP), messenger, SMS (Short Message Service), or the like (Hereinafter, they are just called as "e-mail"), image transmitting part 190 may transmit to an e-mail addressing to an e-mail address of IT administrator, or the like. Also, image transmitting part 190 may transmit image data 580 to NAS, a server, or the like, with the protocol of FTP (File Transfer Protocol), SMB, or the like (Hereinafter, they are just called as "FTP"). Also, image transmitting part 190 may transmit image data 580 to a cloud storage in a server, a web service server, or the like (Hereinafter, they are just called as "cloud") with the various protocols. Also, image transmitting part 190 may enable the support personnel, IT administrator, or the like, to refer to account settings or an address book stored in the document box in memory part 19, or an address book in another server accessible from image forming apparatus 1, or the like, and to select an address for image data 580.

Display operating part 200 connects with connecting part 100 in image forming apparatus 1. In the present embodiment, display operating part 200 may connect with connecting part 100 with the protocol extended from the RFB protocol. In this case, display operating part 200 may execute the "remote panel," which is a program compatible with the RFB client for image forming apparatus 1. Also, display operating part 200 acquires emulated image 410 from above-mentioned connecting part 100 in image forming apparatus 1 and displays it on display part 27. Also, display operating part 200 may execute the remote panel on the web browser in support terminal 2 by using Java Script®, or the like. The program compatible with the RFB client is acquired by connecting with the web server in image forming apparatus 1 or, otherwise, it may be acquired by accessing a web site of a server for a support. Thereby, without prior-installation the dedicated application, and it becomes possible to use the remote panel.

Also, in the present embodiment, display operating part 200 can move the pointer in all areas of emulated image 410 displayed on the web browser in support terminal 2. The areas may include areas other than the area for image of the display panel, which is actually-displayed on display part 47 in operation panel part 16 in image forming apparatus 1. In the present embodiment, as described later, an image of the mode change button is included in an area other than the display panel.

Also, display operating part 200 may enables inputting a character, drawing an annotation picture, or drawing a highlight as a "drawing mode" in the remote panel on the web browser by using a key, a pointer, touch operation, or the like. In this case, the inputted character, the drawn annotation picture or the highlight may be reflected in respective emulated image 410 by display operating part 200. Also, display operating part 200 may have a mode that the operation guidance on a remote panel itself does not reflect on image forming apparatus 1 but only the operating procedure is shown as a "guidance mode."

Also, in the present embodiment, conversation with voice sound between the support personnel and IT administrator may be performed between display operating part 200 in support terminal 2 and connecting part 100 in image forming apparatus 1. Therefore, connecting part 100 and display operating part 200 transmit and receive a packet of voice data 470 between support terminal 2 and image forming apparatus 1 with the protocol extended on the RFB protocol in the session under connection.

Operation transmitting part 210 acquires various instructions of the support personnel on the remote panel and transmits them to image forming apparatus 1. In detail, in the present embodiment, operation transmitting part 210 acquires pointer data about movement and depression of the pointer in emulated image 410 rendered on display part 27. Further, operation transmitting part 210 transmits the pointer data as operational information 400 to image forming apparatus 1 in the session. Also, operation transmitting part 210 can acquire the pointer data having for an area of the physical buttons of operation panel part 16 on emulated image 410.

Also, operation transmitting part 210 can also acquire pointer data on the area for the image of the mode change button in emulated image 410 as operational information 400.

Capture transmitting part 280 transmits emulated image 410 to image forming apparatus 1 as extended data. The extended data may have an attribute other than the pointer data of operational information 400 transmitted by operation transmitting part 210. In detail, capture transmitting part 280 transmits, for example, a whole emulated image 410 to image forming apparatus 1 by the extended message type of the protocol extended on the RFB protocol. In this case, emulated image 410 transmitted by capture transmitting part 280 may be compressed as jpg, PNG, or the like, or may be video data, such as MJPEG, MPG, or the like. Also, emulated image 410 that capture transmitting part 280 transmits may be differential data of data transmitted at last time.

Also, in the present embodiment, display part 27 displays emulated image 410.

Operational information 400 is information for an operation by the support personnel in the remote panel. In detail, operational information 400 may include the pointer data about movement and depression of the pointer in emulated image 410, or the like. Also, operational information 400 may include the information of depression of a button as the pointer data. As information of depression of the button, the information of depression for a physical key in input part 26 may be included. The information of depression for the physical key may be acquired as like the information of depression of the button drawn on emulated image 410 as corresponded to a short-cut key, or the like.

Also, as above-mentioned, operational information 400 may include the pointer data on the area for the image for the mode change button, which changes the mode, or the like.

Emulated image 410 is an image data of emulated operation panel part 16 for image forming apparatus 1 displayed on the web browser. Emulated image 410 may also include an image that emulates an appearance of input part 46 and display part 47 of operation panel part 16. Also, emulated image 410 is a dot matrix image corresponding to the RFB protocol and may be partially- or entirely-updateable on image forming apparatus 1 and support terminal 2. The detailed example of emulated image 410 is described later.

Image data 580 is data including emulated image 410. The emulated image 410 may be an image of the remote panel for remote maintenance with the instructions by the support personnel in support terminal 2. That is, emulated image 410 included in image data 580 may be an image reflecting the character inputting, drawing, or the like, in a "drawing mode" on support terminal 2. Also, emulated image 410 may be an image at the time of being operated to show various operating procedures in a "guidance mode."

Also, image data 580 may be video data at the time of the remote maintenance. Also, the video data may include voice data 470 transmitted and received between support terminal 2 and the self-apparatus.

Also, emulated image 410 includes an image of capture button C for capturing an image in an area other than displaying by operation panel part 16. The area of the capture button C may be on a place other than the areas of panel D, indicator L, and button group B. Also, the capture button C is included only in emulated image 410, and it does not need to be present in operation panel part 16 in image forming apparatus 1. In addition, capture button C may be arranged other than the inside of emulated image 410, or it may be arranged on a menu, a button, or the like, in the web browser. Also, a configuration that depression of the key, or the like, in input part 26 makes an equivalent instruction by depression of capture button C included in operational information 400 is possible.

Here, control part 10 in image forming apparatus 1 executes a control program stored in memory part 19 and functions as connecting part 100, operation acquiring part 110, capturing part 180, and image transmitting part 190. Also, control part 20 in support terminal 2 executes a control program stored in memory part 29 and functions as display operating part 200, operation transmitting part 210, and capture transmitting part 280.

Also, each part of the above-mentioned image forming apparatus 1 and support terminal 2 serves as hardware resources to execute the communication processing method in the present disclosure. In addition, the above-mentioned part or arbitrary combination of a functional configuration may be configured as in hardware with an IC, a programmable logic, FPGA (Field Programmable Gate Array), or the like.

[Capture Transmitting Process in Image Forming System X]

Then, as refer to FIG. 6, a capture transmitting process by image forming system X according to the embodiment of the present disclosure is explained. The capture transmitting process of the present embodiment, mainly, control part 10 of image forming apparatus 1 executes the control program stored in memory part 19, control part 20 of support terminal 2 executes the control program stored in memory part 29 with collaborating each part and using hardware resources. In the following, as refer to a flow chart in FIG. 6, the details of the capture transmitting process are explained for each step.

(Step S151)

Firstly, connecting part 100 of image forming apparatus 1 performs a connecting process. The IT administrator, or the like, uses service of remote maintenance in time of problem solving or training of image forming apparatus 1, or the like. In this case, IT administrator, or the like, may also possibly receive and answer by voice message, directly, with the support personnel in the support terminal 2 by using a voice line, or the like, connected with the image forming apparatus 1. The support personnel may communicate that starting remote maintenance by using the remote panel function of image forming apparatus 1 is desired. Then, IT administrator, or the like, instructs to execute the remote panel as remote maintenance by using operation panel part 16 in image forming apparatus 1, or the like. Thereby, connecting part 100 connects with support terminal 2 in a session of the specific protocol, such as a protocol extended from the RFB protocol. In this case, connecting part 100 executes a program compatible with the RFB server.

Also, in this case, connecting part 100 in image forming apparatus 1 and display operating part 200 in support terminal 2 may connect to transmit and receive voice data 470. The connection may be the same as above-mentioned session. In addition, a voice call by a messenger, or the like, may be performed, separately. Also in this case, connecting part 100 and display operating part 200 may acquire voice data 470 by settings of the mixer of OS, or the like, and may perform transmission and reception between image forming apparatus 1 and support terminal 2.

(Step S251)

Here, display operating part 200 in support terminal 2 performs a display operation acquiring process. The support personnel of support terminal 2 starts the web browser and executes the "remote panel" that is a program compatible with the RFB client. Thereby, display operating part 200 connects with connecting part 100 in image forming apparatus 1 with the protocol extended from the RFB protocol. Thereby, emulated image 410 is displayed on the web browser, and movement, depression of the pointer, or the like, is enabled by input part 26.

(Step S252)

Then, operation transmitting part 210 performs an operational information transmitting process. Operation transmitting part 210 acquires rectangle coordinates of the pointer moved in emulated image 410 on the web browser as the pointer data. Also, operation transmitting part 210 acquires information of depression of a button or a physical key and adds it to the pointer data, too. Operation transmitting part 210 transmits the pointer data as operational information 400 to image forming apparatus 1.

Here, operation transmitting part 210 may also acquire pointer data in the area of the image for the capture button in emulated image 410 as operational information 400, and operation transmitting part 210 may transmit it.

(Step S152)

Then, capturing part 180 determines whether the capture is started or not. In operational information 400, capturing part 180 determines Yes if the area of the image for the capture button is depressed with the pointer. Capturing part 180 determines No if other. In Yes, capturing part 180 advances a process to Step S153. In No, capturing part 180 ends the capture transmitting process.

(Step S153)

In case that capturing is instructed, capturing part 180 performs capture starting process. Capturing part 180 starts waiting to accumulate emulated image 410 from support terminal 2 in image data 580. In this case, capturing part 180 also starts the waiting to accumulate voice data 470 in image data 580. Then, as explained later, capturing part 180 acquires emulated image 410 transmitted from support terminal 2 and accumulates it in image data 580. In this case, capturing part 180 may be stored in various containers after converting or compressing emulated image 410 to video data.

(Step S253)

Here, capture transmitting part 280 in support terminal 2 performs an emulated image transmitting process. Capture transmitting part 280 transmits emulated image 410 to image forming apparatus 1. Emulated image 410 in this case may not be emulated image 410 itself acquired from image forming apparatus 1 but may be an image displayed on display part 27 as the remote panel on the web browser. Also, emulated image 410 in this case may be a drawn image, which the user draws to the remote panel on the web browser. That is, capture transmitting part 280 may transmit emulated image 410 processed in support terminal 2. Also, in the case of transmission of emulated image 410, capture transmitting part 280 may compress or convert emulated image 410 into video data, or extract only difference data, and then transmit it.

(Step S154)

Here, capturing part 180 of image forming apparatus 1 performs a voice data acquiring process. Capturing part 180 acquires voice data 470 transmitted and received between image forming apparatus 1 and support terminal 2, and includes it in image data 580. In this case, capturing part 180 may set up voice data 470 to be synchronized on the time line of the video data.

(Step S155)

Then, image transmitting part 190 performs an image data transmitting process. Image transmitting part 190 transmits image data 580, for example, with reference to account settings. In this case, image transmitting part 190 attaches image data 580 and transmits it to e-mail addresses, such as IT administrator, or the like, by an e-mail. Also, image transmitting part 190 may transmit image data 580 by FTP, SMB, or the like. Also, image transmitting part 190 may transmit image data 580 to the cloud storage. In addition, image data 580 accumulated on the cloud storage is distributed to other customers having the same problem if consent of the customer, such as IT administrator, or the like, is obtained. Therefore, on the cloud storage, for each case of remote maintenance, the support personnel may tag image data 580 as the "snapshot" and may put in a database and store it. As above-mentioned, the capture transmitting process according to the embodiment in the present disclosure is ended.

As configured as mentioned above, the following effects can be obtained.

In typical technology, the screen of remote maintenance is not able to be captured.

On the other hand, image forming system X according to the embodiment in the present disclosure includes image forming apparatus 1 and support terminal 2 for the remote maintenance for image forming apparatus 1. Image forming apparatus 1 is provided with connecting part 100, operation acquiring part 110, capturing part 180, and image transmitting part 190. Connecting part 100 connects with support terminal 2 for remote maintenance in a session of a specific protocol. Operation acquiring part 110 acquires operational information 400 corresponding to operation of support terminal 2 connected by connecting part 100. Capturing part 180 captures emulated image 410. The emulated image 410 is drawn as corresponded to operational information 400 acquired by operation acquiring part 110 and is emulated operation panel part 16 of the self-apparatus displayed on the web browser in support terminal 2. Image transmitting part 190 transmits image data 580 including emulated image 410 captured by capturing part 180. Support terminal 2 is provided with operation transmitting part 210 and capture transmitting part 280. Operation transmitting part 210 transmits pointer data as operational information 400 to image forming apparatus 1 in the session. The pointer data is data about movement and depression of the pointer in emulated image 410 displayed on the web browser. Capture transmitting part 280 transmits emulated image 410 to image forming apparatus 1 as extended data with attributes other than the pointer data transmitted by operation transmitting part 210.

As configured in this way, unlike accumulating a script or the like, preserving image data 580 in accordance with practical actions for a file in image forming apparatus 1, or the like, can be performed.

That is, the image forming apparatus that can reproduce the screen of remote maintenance, certainly, is provided. Therefore, the screen data used for the support personnel for teaching operation to IT administrator, or the like, can be transmitted to IT administrator, or the like, as it is.

Also, in typical technology, knowledge taught operation of image forming apparatus 1 in remote maintenance from the support personnel to IT administrator, or the like, may be lost. This cause is a transfer of IT administrator, a person in charge, or the like, or just progress of time, or the like. Therefore, the support personnel need to teach operator guidance again to IT administrator, or the like. On the other hand, education of the operator guidance for the second time, easily, is possible by transmitting image data 580. Also, if consent of customers, such as IT administrator, or the like, is obtained, using image data 580 to other customers' education or providing it to the other customer in an equivalent case for remote maintenance is possible. Thereby, the efficiency of remote maintenance can be increased.

Also, in image forming apparatus 1 according to the embodiment in the present disclosure, image data 580 may be video data. Also, the video data may include voice data 470 transmitted and received between support terminal 2 and the self-apparatus. As configured in this way, education by the support personnel in remote maintenance, or the like, as mentioned above, can be more intelligible, and the efficiency can be increased.

Also, in image forming apparatus 1 according to the embodiment in the present disclosure, image transmitting part 190 transmits image data 580 by an e-mail or FTP, or to cloud storage. As configured in this way, transmitting image data 580 to IT administrator, or the like, can be performed, or to preserve and accumulate it in the other server can be performed. As a result, the efficiency of the education by the support personnel, or the like, can be increased.

Also, in image forming apparatus 1 according to the embodiment in the present disclosure, the specific protocol is a protocol extended on the RFB protocol. Also, operational information 400 includes pointer data about movement and depression of a pointer on emulated image 410. Capturing part 180 captures emulated image 410 with extended data other than the pointer data. As configured in this way, the specification of the RFB protocol is maintained and is extended. Thereby, in the session between image forming apparatus 1 and support terminal 2, sending the capture image can be performed. As a result, problems such as connection, or the like, are less-likely to occur.

Other Embodiments

In addition, in the above-mentioned embodiment, a configuration that image forming apparatus 1 has image transmitting part 190 and transmits image data 580 from image forming apparatus 1 is explained. However, image data 580 may be transmitted not only from image forming apparatus 1 but from support terminal 2. As refer to FIG. 7, support terminal 2 of image forming system Y according to other embodiments in the present disclosure is provided with capture transmission and reception part 281 and image transmitting part 290. Further, FIG. 7 gives the same numerals about the component having equivalent configuration as above-mentioned other figures.

Capture transmission and reception part 281 has the function of capture transmitting part 280 in image forming apparatus 1, also it acquires image data from image forming apparatus 1 as extended data, and it stores them in memory part 29.

Image transmitting part 290 transmits image data 580 as like image transmitting part 190 in image forming apparatus 1. In this case, image transmitting part 290 may transmit image data 580 by using various protocols, or the like, which support terminal 2 supports in addition to transmit by an e-mail or FTP, or to cloud storage, or the like. Also, image transmitting part 290 may couple and transmit it with an installed application, or the like. The application, or the like, for example, may include a device driver, such as various kinds of cloud storage, a network drive, and storage of iSCSI, or the like. Also, the application may be an application specifying for a support where the support personnel use.

As configured in this way, to transmit image data 580 by using the protocol, or the like, and function, which support terminal 2 supports in addition to the protocol, or the like, which image forming apparatus 1 supports is possible. Thereby, convenience of the support personnel, IT administrator, or the like, can be improved. Also, since an address, or the like, is easily selected in support terminal 2 by using GUI, or the like, the transmission becomes easier.

Also, in image forming system Y, the support personnel or IT administrator, or the like, may select whether image data 580 is transmitted from image forming apparatus 1 or from support terminal 2. Also, image data 580 transmitted from image forming apparatus 1 or from support terminal 2 may be different. For example, when transmitting from image forming apparatus 1, image data 580, which does not include the image of the area for a physical button, or the like, may be transmitted. On the contrary, when transmitting from support terminal 2, image data 580, which is a whole emulated image 410 including a physical button, or the like, may be transmitted. Also, a configuration that image data 580 is not generated in image forming apparatus 1 but is generated in support terminal 2 is also possible. In this case, voice data 470 may be acquired in support terminal 2, and it may be included to image data 590. Also, for generating image data 580, conversion of a format, or the like, may be performed in other external servers. Also, it may be a configuration that transmits image data 580 only from support terminal 2. As configured in this way, transmitting image data 580 according to user environment can be performed. Also, by generating image data 580 in support terminal 2, the loading of image forming apparatus 1 can be decreased.

In the above-mentioned embodiment, an example that executes the remote panel with the RFB protocol is explained. However, a remote panel may be performed with other original protocols, and the above-mentioned remote maintenance may be performed. Also, in an above-mentioned embodiment, an example that a program corresponding to an RFB client is executed on a web browser in support terminal 2 to perform the remote panel is explained. However, in support terminal 2, a dedicated application may be installed, and a remote panel may be performed. For example, emulated image 410 may be generated in image forming apparatus 1, without using VNC, or the like, the image may be pushed to the web browser or the dedicated application, serially, or streaming may be performed in support terminal 2. Also, contrary, in support terminal 2, an operation display program that generates emulated image 410 of image forming apparatus 1 corresponding to operation of the support personnel may be executed. In this case, by executing the operation display program, operational information 400 may be transmitted as well as the above-mentioned configuration, and image forming apparatus 1 may be controlled. Also, in this case, without transmitting the image data itself from image forming apparatus 1, only data required to generate emulated image 410, which is data related to a user file, or the like, may be transmitted. In addition, the operation display program may be a "real" emulator that executes the control program, which is similar program stored in memory part 19 in image forming apparatus 1, at support terminal 2. As configured in this way, a remote panel can be established even if an environment that the RFB protocol is unusable, for example, environment connectable only with the port of HTTP, or the like. Also, it is also possible to configure so as to compress the bandwidth of data related to transmission and reception of data.

Also, in the above-mentioned embodiment, it is mainly-disclosed an example that operation by the support personnel is reflected in displaying or controlling to image forming apparatus 1. However, the operation by IT administrator, or the like, to operation panel part 16 in image forming apparatus 1 may be reflected in controlling of emulated image 410 or image forming apparatus 1. Also, it is possible to configure that the reflected result may be transmitted to support terminal 2. Thereby, in addition to instruction and operation by the support personnel, corresponding to actual operation by IT administrator, emulated image 410 can be generated, or image forming apparatus 1 can be controlled. This can help IT administrator in training, or the like, understand well.

Also, as above-mentioned embodiment, a configuration that captures emulated image 410 transmitted from support terminal 2 is disclosed. However, a configuration that captures emulated image 410 stored in memory part 19 in image forming apparatus 1 and preserves as image data 580 is also possible. Even in this case, input of a character, drawing of an annotation picture, or drawing of a highlight may be possible in the "drawing mode" for emulated image 410 in memory part 19 by the support personnel's pointer data. Also, each part of image forming apparatus 1 may not be controlled in the "guidance mode."

As configured in this way, the increase in the data traffic in the session can be suppressed by transmitting emulated image 410 from support terminal 2.

Also, in image data 580, emulated image 410 may be stored as a still picture as like a "flip book," and voice data 470 may not be included. Also, image data 580 may be compressed at the time of transmission by image transmitting part 190 or may be compressed on cloud storage.

Also, the present disclosure is applicable to information processing apparatus other than the image forming apparatus. That is, it may be configured to use the network scanner, a server, or the like, which separately-connected with a scanner by USB, or the like.

Also, the configuration and operation of the above-mentioned embodiment are an example, and it cannot be overemphasized that it can change suitably and can execute in the range that does not deviate from the aim of the present disclosure.

What is claimed is:

1. An image forming apparatus comprising:
   a connecting part configured to connect with a terminal for remote maintenance in a session of a specific protocol;
   an operation acquiring part configured to acquire operational information corresponding to operation of the terminal connected by the connecting part;
   a capturing part configured to capture an emulated image emulated on an operation panel of a self-apparatus, drawn as corresponding to the operational information acquired by the operation acquiring part, and displayed on a web browser of the terminal; and
   an image transmitting part configured to transmit image data including the emulated image captured by the capturing part.

2. The image forming apparatus according to claim 1, wherein
   the image data is video data, and
   the video data allowing to include voice data transmitted and received between the terminal and the self-apparatus.

3. The image forming apparatus according to claim 1, wherein
   the image transmitting part transmits the image data by an e-mail or FTP, or to cloud storage.

4. The image forming apparatus according to claim 1, wherein
   the specific protocol is a protocol extended from an RFB protocol, and
   the operational information includes pointer data about movement and depression of a pointer on the emulated image; and
   the capturing part
   captures the emulated image with extended data other than the pointer data.

5. An image forming system having an image forming apparatus and a terminal for remote maintenance of the image forming apparatus, wherein
   the image forming apparatus includes:
   a connecting part configured to connect with the terminal in a session of a specific protocol,
   an operation acquiring part configured to acquire operational information corresponding to operation of the terminal connected by the connecting part,
   a capturing part configured to capture an emulated image emulated on an operation panel of a self-apparatus, drawn as corresponding to the operational information acquired by the operation acquiring part, and displayed on a web browser of the terminal; and
   an image transmitting part configured to transmit image data including the emulated image captured by the capturing part; and
   the terminal includes:
   an operation transmitting part configured to transmit the pointer data about movement and depression of a pointer in the emulated image displayed on the web browser to the image forming apparatus in the session as the operational information, and
   a capture transmitting part configured to transmit the emulated image to the image forming apparatus as extended data with an attribute other than the pointer data transmitted by the operation transmitting part.

6. The image forming system according to claim 5, wherein
   the image data is video data, and
   the video data allows to include voice data transmitted and received between the terminal and the self-apparatus.

7. The image forming system according to claim 5, wherein
   the image transmitting part transmits the image data by an e-mail or FTP, or to cloud storage.

8. The image forming system according to claim 5, wherein
   the specific protocol is a protocol extended from an RFB protocol.

9. The image forming system according to claim 5, wherein the image forming apparatus further includes the image transmitting part, and wherein
   the image transmitting part in the image forming apparatus is configured to be switchable.

10. A communication processing method executed by an image forming apparatus capable of communicating to a terminal for remote maintenance, comprising the steps of:
    connecting with the terminal in a session of a specific protocol;
    acquiring operational information corresponding to operation of the connected terminal;
    capturing an emulated image emulated an operation panel of a self-apparatus, drawn as corresponding to the acquired operational information, and displayed on a web browser of the terminal; and
    transmitting image data including the captured emulated image.

11. The communication processing method according to claim 10, wherein
    the image data is video data, and
    the video data allows to include voice data transmitted and received between the terminal and the self-apparatus.

12. The communication processing method according to claim 10, wherein
    transmitting the image data includes transmitting the image data by an e-mail, FTP, or to cloud storage.

13. The communication processing method according to claim 10, wherein
    the specific protocol is a protocol extended from an RFB protocol,
    the operational information includes pointer data about movement and depression of a pointer on the emulated image; and capturing the emulated image includes capturing the emulated image with extended data other than the pointer data.

\* \* \* \* \*